US011112311B2

(12) United States Patent
Liefferink

(10) Patent No.: US 11,112,311 B2
(45) Date of Patent: Sep. 7, 2021

(54) PRESS OPERATOR TARGET, LMD STANDARD AND COLOUR PROOF ASSEMBLY

(71) Applicant: Hauke Maritz Liefferink, Sandton (ZA)

(72) Inventor: Hauke Maritz Liefferink, Sandton (ZA)

( * ) Notice: Subject to any disclaimer, the term of this patent is extended or adjusted under 35 U.S.C. 154(b) by 155 days.

(21) Appl. No.: 16/165,144

(22) Filed: Oct. 19, 2018

(65) Prior Publication Data

US 2019/0120695 A1 Apr. 25, 2019

Related U.S. Application Data

(63) Continuation of application No. PCT/IB2017/052107, filed on Apr. 12, 2017.

(30) Foreign Application Priority Data

Apr. 20, 2016 (ZA) .................................. 2016/02710

(51) Int. Cl.
*G01J 3/52* (2006.01)
*H04N 1/40* (2006.01)
*H04N 1/60* (2006.01)

(52) U.S. Cl.
CPC .................. *G01J 3/52* (2013.01); *H04N 1/40* (2013.01); *H04N 1/6033* (2013.01)

(58) Field of Classification Search
CPC ................................. G01J 3/52; H04N 1/6033
See application file for complete search history.

(56) References Cited

U.S. PATENT DOCUMENTS

| 5,598,272 A | 1/1997 | Fisch et al. |
| 6,204,873 B1 | 3/2001 | Shimazaki |
| 2004/0056965 A1* | 3/2004 | Bevans ................ H04N 1/6033 348/222.1 |

FOREIGN PATENT DOCUMENTS

| EP | 0 857 998 | 8/1988 |
| EP | 0 613 062 | 8/1994 |
| JP | 2005-27094 | 1/2005 |
| WO | WO 00/36819 | 6/2000 |
| WO | 2013/037130 | 3/2013 |

OTHER PUBLICATIONS

Supplementary Partial European Search Report, EP Appln. 17785534 (dated Jan. 4, 2020).
International Search Report for PCT/IB2017/052107 dated Jul. 11, 2017, 4 pages.
Written Opinion of the ISA for PCT/IB2017/052107 dated Jul. 11, 2017, 4 pages.

* cited by examiner

*Primary Examiner* — Hwa Andrew Lee
(74) *Attorney, Agent, or Firm* — Nixon & Vanderhye, P.C.

(57) ABSTRACT

The invention provides a press operator target for facilitating visual verification of colour accuracy in printed colour matter against an ideal colour proof. The invention also includes so-called Light/Master/Dark ("LMD") standards for visually accessing colour variation that is acceptable in a particular print design and to aid a press operator in decision making in order to achieve a better proof to print match. Finally the aforementioned items are assembled into a colour proof assembly, which includes the press operator target, as well as the LMD standards.

3 Claims, 3 Drawing Sheets
(3 of 3 Drawing Sheet(s) Filed in Color)

PRESS OPERATOR TARGET, LMD STANDARD AND COLOUR PROOF ASSEMBLY

CROSS-REFERENCE TO RELATED APPLICATIONS

This application is a continuation of International Application No. PCT/IB2017/052107 filed Apr. 12, 2017 which designated the U.S. and claims priority to ZA Patent Application No. 2016/02710 filed Apr. 20, 2016, the entire contents of each of which are hereby incorporated by reference.

INTRODUCTION

The invention provides a press operator target for facilitating visual verification of colour accuracy in printed colour matter against an ideal colour proof. The invention also includes so-called Light/Master/Dark ("LMD") standards for visually accessing colour variation that is acceptable in a particular print design and to aid a press operator in decision making in order to achieve a better proof to print match. Finally the aforementioned items are assembled into a colour proof assembly, which includes the press operator target, as well as the LMD standards.

BACKGROUND TO THE INVENTION

In the printing industry, a customer (print buyer) would commission a designer and approve a specific artwork to be used in a printing job, for example high end food labels, including a set of particular colours to be embodied in the artwork. This set of target colours, which specifies an exact colour palette and colour requirements of a final press printed matter, when assembled and proofed, is referred to as a "colour proof".

In printing processes, whether it be conventional (e.g. flexographic, rotogravure, lithographic, silkscreen, etc.) or digital (e.g. inkjet, laser, toner, etc.) processes, a design intended for printing is separated at some point into process and/or spot colour inks. These inks are physically present in a press or printing device and are deposited onto a physical substrate in appropriate ink film thicknesses, at an appropriate tonal coverage, with appropriate colour characteristics and transparencies, resulting in an image portraying an intended design and matching the customer approved colour proof as closely as possible. These inks create colours beyond their individual characteristics due to the ability to vary density (related to ink film thickness), tone (percentage of a colour) and trap (overprints).

It is of paramount importance that the perceived colours of the final press printed matter accurately reflect and align with the customer approved colour proof.

In addition, colour appearance of a final press printed matter is strongly influenced by the substrate on which it is printed, as well as the influence of varnishes and lamination.

To aid in guiding the printing process toward a successful outcome from a colour perspective, during the printing process, a colour target bar is typically printed with each print job, which colour target bar can be tested to verify colour accuracy in the final press printed matter and provide the press or press operator with data to aid adjustments or improvements that can be made to more closely match the printed matter to a standard, sometimes in line with the standard the customer approved colour proof attempted to match. A colour target bar comprises a series of colours, arranged in sequence adjacent each other, and which reflect the colours to be used in a particular printing job. It will be appreciated that the colour target bar of each printing job will vary, depending the particular colours to be used for each printing job.

One way of verifying colour accuracy of final press printed matter is to test the colour accuracy of individual targets in a colour target bar on the final press printed matter against a standard or predetermined target value through use of a spectrometer or densitometer. A spectrometer measures the visible light spectrum and calculates a spectral reflectance curve. In printing, another device called a "reflection densitometer" is used in determining the appropriate amount of each printing ink deposited by a press or printing device by measuring the percentage of light reflected by a printing substrate, at specific wavelengths.

Although both spectrometers and densitometers provide accurate colour target assessments and point to adjustments that could be made on a printing press or device to improve colour matching, they do not always provide feedback that correlates efficiently with the observer and are lacking in that they do not encourage visual colour target bar comparison between a colour proof and the final press printed matter. Such equipment is expensive, and not easily affordable by smaller printing businesses. Moreover, on-press or inline instruments are not suitable for all types of printing presses due to a variation in printing web widths and printing speeds of different presses. Offline or handheld instruments often substantially reduce press productivity in that they mostly require the interpretation of measured results which may involve comparison to data in a table. Multiple measurements of various samples are required to formulate an opinion of which ink or press parameters require adjustment in order to improve accuracy of matching a print to an approved colour proof. In addition, equipment re-calibration is required to define new standards for each new substrate being printed which is a lengthy and laborious exercise, requiring skilled labour, with a result that it often simply doesn't get done.

Consequently, many printers rely on a visual assessment of the colours in a printing job against the colour proofs. However, such visual assessment, without practical aids for establishing context, can be materially flawed due to the characteristics of a human observer's perception of colour. Colour memory, constancy, background effects, retinal fatigue and lighting conditions can make colours appear different when that are in fact the same, or conversely appear the same, when they are very different.

Consequently, the applicant has identified a need for a visual aid to assist in visual verification of colour accuracy in printed colour matter against an ideal colour proof, which is cheap and easy to use, and which eliminates, or at least significantly reduces, the effects of colour memory, constancy, background effects, retinal fatigue and lighting conditions on colour assessment.

Observing a deviation in colour enables a press operator to make the appropriate adjustments, where possible and depending on the printing process, to more accurately match final printed matter to the approved colour proof.

Furthermore, since a flawless match to an approved colour proof is highly unlikely to be achieved, illustrating an acceptable range by creating LMD standards enables a press operator to observe clearly what variation was deemed acceptable at the point a print buyer signed off or approved the colour proof.

SUMMARY OF THE INVENTION

According to a first aspect of the invention there is provided a press operator target adapted for visually verifying colour accuracy in final press printed matter against an ideal colour proof, the press operator target comprising a series of target colours reflecting the ideal colours to be achieved for a particular final press printed matter, and corresponding with the same set of colours to be used on a colour target bar on the final press printed matter; the press operator target being characterised therein that the target colours are printed on a perfectly hue neutral, middle grey background (L50a0b0); the arrangement being such that colour accuracy in the printed colour matter is verified against the ideal colours to be achieved by aligning the press operator target with the colour target bar on the final press printed matter, such that each colour of the colour target bar is visually comparable to its corresponding colour on the press operator target.

In a preferred form of the invention the target colours of the press operator target are arranged in sequence adjacent each other and corresponding to the sequence of colours of the colour target bar.

The press operator target further may include a series of punched windows arranged adjacent each other with each window being aligned with a particular target colour on the press operator target; the arrangement being such that in use the series of punched windows is laid over the colour target bar on the final press printed matter, such that each colour of the colour target bar is visually assessable through a separate punched window and individually comparable to its corresponding target colour on the press operator target. This greatly assists in avoiding the effects of colour memory, constancy, background effects and retinal fatigue.

The series of target colours on the press operator target may be grouped together and divided between solid ink colours, half-tone ink colours and trapping ink colours; wherein the solid ink colours are used visually to assess colour density, hue and chroma; the half-tone ink colours are used visually to assess dot gain or tone value increase; and the trapping ink colours are used visually to assess ink overprinting characteristics most frequently indicating ink transparency, sequencing or drying problems. In particular, colour accuracy verification in the final press printed matter is done by first comparing the solid ink colours of the colour target bar against the solid ink target colours of the press operator target, which provides information on colour density, hue and chroma, the arrangement being such that a variation in colour density may be indicative of a problem with the settings of an inking system of a printing press, leading an investigation into press colour controls affecting ink film thickness and investigating (in process applicable instances) for example a doctor blade, ink viscosity, anilox selection, etc.; whereas a variation in hue (where the colour density appears to be correct) may be indicative of a printing ink problem as compared to a reference ink, leading an investigation into the colour of virgin inks supplied, off press.

Reduced chroma (where the colour density appears to be correct) often indicates ink contamination or substrate or white ink opacity problems.

Once the solid ink colours of the colour target bar and press operator target are the same, the second step of colour accuracy verification involves comparing the half-tone ink colours of the colour target bar against the half-tone ink colours of the press operator target; the arrangement being such that if the colour target bar colours are too dark, the dot gain (TVI) needs to be reduced, and if the colour target bar colours are too light, dot gain (TVI) needs to be increased.

A third level of colour verification involves comparing the trapping (overprinting) ink colours of the colour target bar against the trapping ink colours of the press operator target, the arrangement being such that a variation in colour is indicative of drying problems associated with the final press printed matter or with the transparency of virgin inks.

The press operator target also may include a substrate colour standard which is used to verify a printable substrate colour against the proof substrate colour standard for which a particular colour palette was designed, keeping in mind that a variation in substrate colour will influence colour appearance in a final printed product.

The press operator target also may include a grey balance standard. This target colour is greatly influenced by dot gain (tone value increase) and a change in hue can quickly point a press operator toward increasing or decreasing dot gain on ink/s responsible for the colour shift.

The press operator target further may include a lighting indicator which is used to verify that colour assessment and verification is done under known and correct lighting conditions, the lighting indicator comprising two light-sensitive patches which react to an observer's viewing illumination and change colour under different lighting temperatures, the arrangement being such that under proper lighting conditions the two patches will appear to match, but if the lighting conditions are not within a proper range, the two patches will appear to be different. The further the observer's light source is from the proper range, the more contrast the two colours of the indicator will display.

The press operator target may be printed on a sheet material of a digital proofing paper conforming to ISO 12647-7.

The press operator target may be produced through inkjet printing.

According to a second aspect of the invention there is provided a Light/Master/Dark ("LMD") standard for visually accessing acceptable colour deviation for a particular final press printed matter and illustrating the effects of substrate and/or lamination and/or varnishing on final colour appearance of the final press printed matter, wherein the light and dark standards are colour accurate representations of light and dark colour variations from a master standard, but which define acceptable colour ranges for a particular final press printed matter;

the LMD being characterised therein that it is digitally produced accurately to simulate colour variation of a final press printed matter, without using actual inks, actual substrate or actual printing machines to be employed in a particular printing job.

The LMD derives actual colour data for each simulation from separate press characterisations (colour profiles) where light, master and dark samples were produced; or from one press characterisation profile that has been manipulated from the master standard to simulate greater TVI and/or ink film thickness, that may contain variation in lightness, hue and chroma of process inks, spot colour inks, and substrate; so or from artwork that has been manipulated and assembled to simulate LMD variation when printed with the same press simulation profile.

According to a third aspect of the invention there is provided a colour proof assembly, which comprises—
    the press operator target; and
    the Light/Master/Dark ("LMD") standard.

According to a fourth aspect of the invention there is provided a method of visually verifying colour accuracy in final press printed matter against an ideal colour proof, the method comprising the steps of—
    providing a press operator target as hereinbefore defined;

inspecting the lighting indicator to verify that colour assessment and verification is done under correct lighting conditions by ensuring that the lighting indicator patches appear to match, comparing the substrate colour standard to the substrate of the final press printed matter to verify that the substrate colour of the final press printed matter correlates with the substrate colour standard for which a colour palette for the particular final press printed matter was designed;

aligning the target colours of the press operator target with a colour target bar of the final press printed matter such that each colour of the colour target bar is visually comparable to its corresponding colour on the press operator target;

comparing the solid ink colours of the colour target bar against the solid ink colours of the press operator target to assess colour density, hue and chroma in the final press printed matter;

comparing the half-tone ink colours of the colour target bar against the half-tone ink colours of the press operator target to assess plate pressure of a printing press; and comparing the trapping ink colours of the colour target bar against the trapping ink colours of the press operator target, to assess ink transparency and drying efficacy in the final press printed matter.

The method may include the further steps of providing a light/master/dark ("LMD") standard as hereinbefore defined and comparing the final press printed matter against the LMD standard to verify that the colours of the final press printed matter fall within the acceptable colour ranges of the LMD standard for a particular substrate.

SPECIFIC EMBODIMENT OF THE INVENTION

The patent or application file contains at least one drawing executed in colour. Copies of this patent or patent application publication with colour drawings will be provided by the Office upon request and payment of the necessary fee.

Colour and visual verification of colour accuracy are essential features of the invention. It is therefore of paramount importance that the specification and accompanying colour figures are interpreted against this background.

Without wishing to be bound thereto, the invention will now further be described by way of examples only and with reference to the accompanying representations, wherein—

Figure 1:
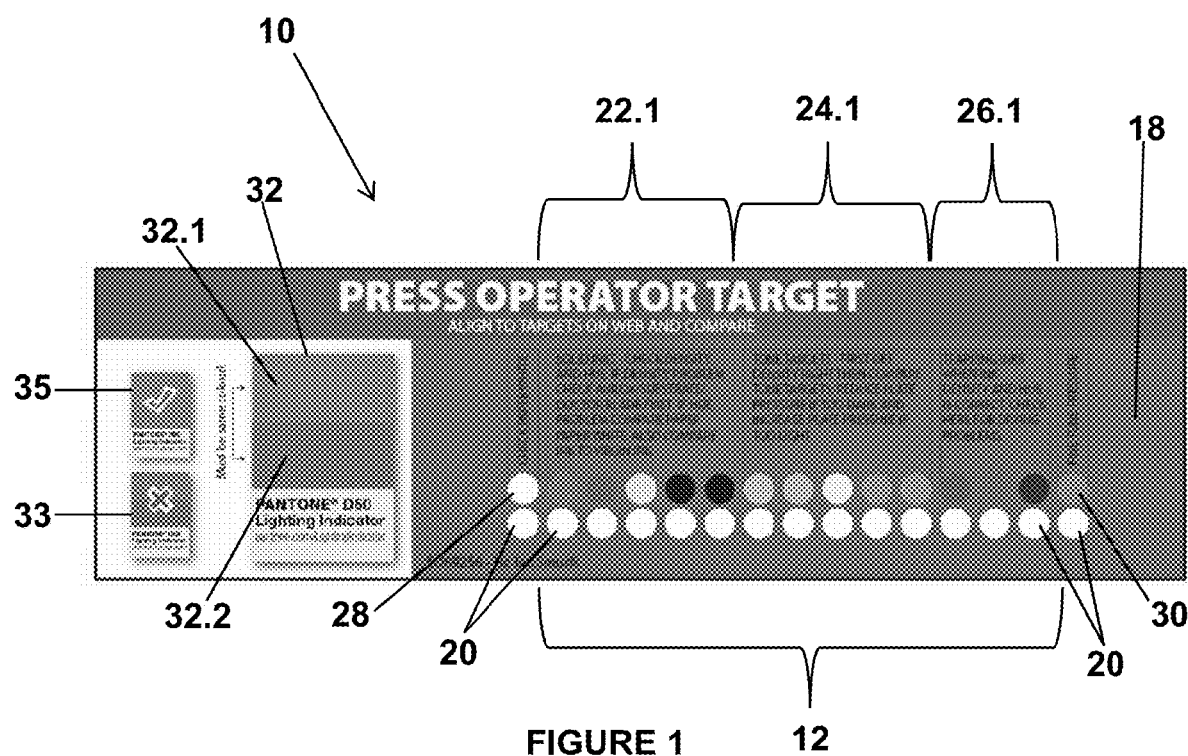
FIG. 1 is an example of a press operator target according to a first aspect of the invention.
Figure 2:
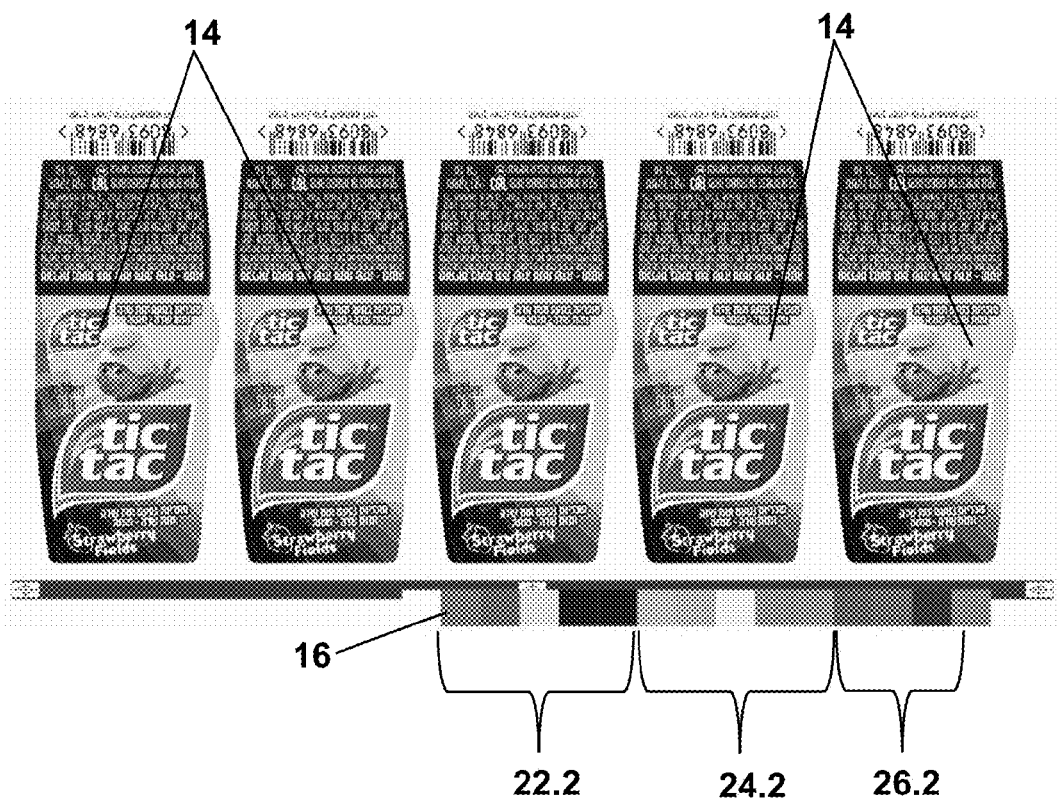
FIG. 2 is an example of a partial sheet or web of final press printed matter, in this case self-adhesive labels for a food product, which illustrates the colour target bar.
Figure 3:
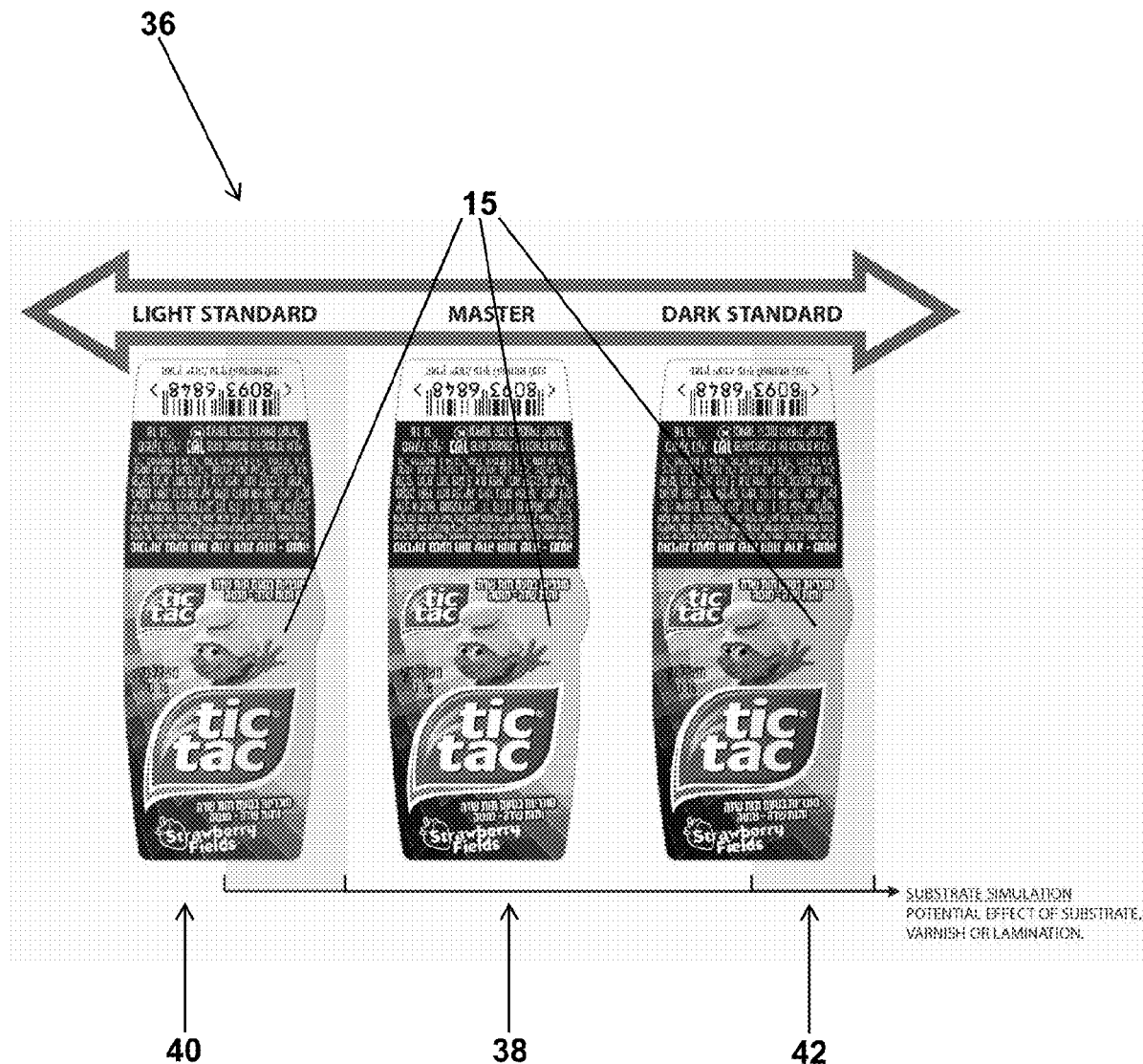
FIG. 3 is an example of the LMD standard according to a second aspect of the invention.
Figure 4:
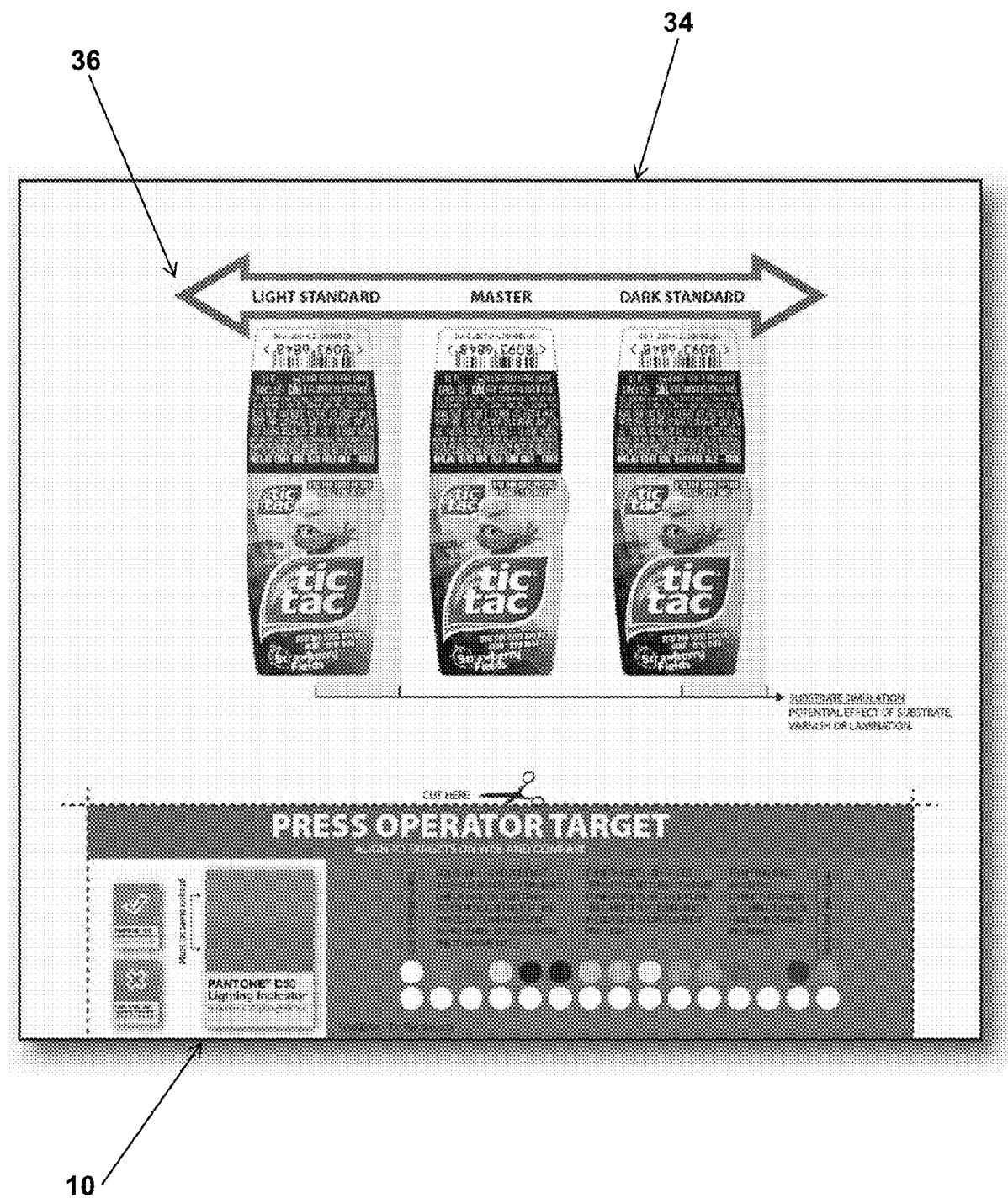
FIG. 4 is an example of a colour proof assembly according to a third aspect of the invention, which includes the press operator target and LMD standard.

A press operator target according to the invention is generally designated by reference numeral [10] and consists of a sheet of material which comprises a series of press operator target colours [12] printed on it. The target colours [12] comprises a series of colours, arranged in sequence adjacent each other and reflecting ideal colours to be matched for a final press printed matter [14]. The target colours [12] correspond with a same set of colours to be used on a colour target bar [16] on the final press printed matter [14]. The press operator target [10] is characterised therein that the target colours [12] are printed against a grey background [18], specifically coloured L50a0b0, thus having no perceptible hue-angle. This aids in creating a neutral reference against which deviation in hue angle is more easily defined and helps to reduce the effects of colour constancy, context and retinal fatigue.

In use, the colour accuracy in the final press printed matter [14] is verified against the ideal colour proof colours by aligning the press operator target colours [12] with the colour target bar [16], such that each colour of the colour target bar [16] is visually comparable to its corresponding colour on the press operator target [10].

In this embodiment of the invention, the press operator target [10] further includes a series of punched windows [20] arranged adjacent each other with each window [20] being aligned with a particular colour [12] on the press operator target [10]; the arrangement being such that in use the series of punched windows [20] is laid over the colour target bar [16] on the final press printed matter [14], such that each colour of the colour target bar [16] is visually assessable through a separate punched window [20] and individually comparable to its corresponding colour on the press operator target [10].

The series of target colours [12] on the press operator target [10] are grouped together and divided between solid ink colours [22.1], half-tone ink colours [24.1] and trapping ink colours [26.1]; wherein the solid ink colours [22.1] are used visually to assess colour density, hue and chroma; the half-tone ink colours [24.1] are used visually to assess dot gain (TVI); and the trapping ink colours [26.1] are used visually to assess ink drying problems. In particular, colour accuracy verification in the final press printed matter [14] is done by first comparing the solid ink colours [22.2] of the colour target bar [16] against the solid ink colours [22.1] of the press operator target [10]; then comparing the half-tone ink colours [24.2] of the colour target bar [16] against the half-tone ink colours [24.1] of the press operator target [10]; and lastly comparing the trapping ink colours [26.2] of the colour target bar [16] against the trapping ink colours [26.1] of the press operator target [10].

The press operator target [10] also includes a substrate colour standard [28] which is used to verify a printed substrate colour against the substrate colour standard [28] for which a particular colour palette was designed.

The press operator target [10] may also include a grey balance target [30].

The press operator target [10] further includes a lighting indicator [32] which is used to verify that colour assessment and verification is done under known and correct lighting conditions. The lighting indicator [32] comprises two light-sensitive patches [32.1; 32.2] which react to an observer's viewing illumination, differing in colour under incorrect lighting conditions [33], but under correct lighting conditions [35], the two lighting indicator patches [32.1; 32.2] will appear to match each other. The lighting indicator may be a PANTONE D50 Lighting Indicator sticker.

According to a further aspect of the invention there is provided a colour proof assembly [34], which is a sheet of material and which comprises the press operator target [10]; [34] and a light/master/dark ("LMD") standard [36] for visually accessing acceptable colour deviation for a particular final press printed matter and illustrating the effects of substrate and/or lamination and/or varnishing on the colour appearance of final press printed matter [15].

The LMD standard [36] includes a master standard [38] of the intended colour aims for a print design as well as a light [40] and a dark standard [42], wherein the light and dark standards [40; 42] are colour accurate representations of light and dark colour variations from the master standard [38], and which define acceptable colour ranges for a particular final press printed matter [14]. The LMD standard [36] is characterised therein that it is digitally produced accurately to simulate acceptable colour variation of the final press printed matter [14], without using actual inks, actual substrate or actual printing machines to be employed in a particular printing job.

It is known in prior art for the ink and printing industry to produce LMD ink drawdowns and machine proofs. This is typically done with actual inks to be used in a particular printing job, on actual substrate to be printed and, in case of a printing shop, an actual press that would be utilised to print the substrate. The LMD standard of the colour proof assembly of the invention differs in that the LMD standard is digitally produced to simulate the final press printed matter.

The LMD standard [36] of the invention derives actual colour data for each simulation from separate press characterisations (colour profiles) where light, master and dark samples were produced; or from one press characterisation profile that has been manipulated from the master standard to simulate greater TVI and/or ink film thickness, that may contain variation in lightness, hue and chroma of process inks, spot colour inks, and substrate; or from artwork that has been manipulated and assembled to simulate LMD variation when printed with the same press simulation profile.

The colour proof assembly [34] of the invention is used to conveniently combine all important visual tools which aid in evaluating colour accuracy in final press printed matter [14]. This is done by providing a press operator target [10] as hereinbefore defined; inspecting the lighting indicator [32] to verify that colour assessment and verification is done under correct lighting conditions by ensuring that the lighting indicator appears as a uniform colour area [35]; comparing the substrate colour standard [28] to the substrate of the final press printed matter [14] to verify that the substrate colour of the final press printed matter [14] correlates with the substrate colour standard [28] for which a colour palette for the particular final press printed matter [14] was designed; aligning the target colours [12] of the press operator target [10] with a colour target bar [16] of the final press printed matter [14] such that each colour of the colour target bar [16] is visually comparable to its corresponding colour on the press operator target [10]; comparing the solid ink colours [22.2] of the colour target bar [16] against the solid ink colours [22.1] of the press operator target [10] to assess colour density, hue and chroma in the final press printed matter [14]; comparing the half-tone ink colours [24.2] of the colour target bar [16] against the half-tone ink colours [24.1] of the press operator target [10] to assess dot gain; and comparing the trapping ink colours [26.2] of the colour target bar [16] against the trapping ink colours [26.1] of the press operator target swatches [12], to assess ink transparency, sequencing and drying efficacy in the final press printed matter [14].

The method includes the further steps of providing the light/master/dark ("LMD") standard [36] as hereinbefore defined and comparing the final press printed matter [14] against the LMD standard [36] to verify that the colours of the final press printed matter [14] fall within the acceptable colour range of the LMD standards [36].

Other embodiments of the invention are possible without departing from the spirit or scope of the invention as defined in the claims.

The invention claimed is:

1. A visual aid product comprising a Light/Master/Dark ("LMD") standard including a master standard, a light standard and a dark standard for visually accessing colour deviation for a particular final press printed matter and illustrating the effects of substrate and/or lamination and/or varnishing on final colour appearance of the final press printed matter, wherein the light standard and the dark standard are colour representations of light and dark colour variations from the master standard, but which define colour ranges for a particular final press printed matter; wherein the LMD standard is digitally produced on the product to simulate colour variation of a final press printed matter, without using actual inks, actual substrate or actual printing machines to be employed in a particular printing job of the particular final press printed matter, and wherein the LMD standard comprises actual colour data for each simulation derived from separate press characteristics including colour profiles from produced light, master and dark samples.

2. A visual aid product comprising a Light/Master/Dark ("LMD") standard including a master standard, a light standard and a dark standard for visually accessing colour deviation for a particular final press printed matter and illustrating the effects of substrate and/or lamination and/or varnishing on final colour appearance of the final press printed matter, wherein the light standard and the dark standard are colour representations of light and dark colour variations from the master standard, but which define colour ranges for a particular final press printed matter; wherein the LMD standard is digitally produced on the product to simulate colour variation of a final press printed matter, without using actual inks, actual substrate or actual printing machines to be employed in a particular printing job of the particular final press printed matter, and wherein the LMD standard comprises actual colour data for each simulation derived from one press characterisation profile that has been manipulated from the master standard to simulate greater TVI and/or ink film thickness, that includes variation in lightness, hue and chroma of process inks, spot colour inks, and substrate.

3. A visual aid product comprising a Light/Master/Dark ("LMD") standard including a master standard, a light standard and a dark standard for visually accessing colour deviation for a particular final press printed matter and illustrating the effects of substrate and/or lamination and/or varnishing on final colour appearance of the final press printed matter, wherein the light standard and the dark standard are colour representations of light and dark colour variations from the master standard, but which define colour ranges for a particular final press printed matter; wherein the LMD standard is digitally produced on the product to simulate colour variation of a final press printed matter, without using actual inks, actual substrate or actual printing machines to be employed in a particular printing job of the particular final press printed matter, and wherein the LMD standard comprises actual colour data for each simulation derived from artwork that has been manipulated and assembled to simulate LMD variation when printed with a same press simulation profile used for printing the particular final press printed matter.

* * * * *

UNITED STATES PATENT AND TRADEMARK OFFICE
CERTIFICATE OF CORRECTION

| | |
|---|---|
| PATENT NO. | : 11,112,311 B2 |
| APPLICATION NO. | : 16/165144 |
| DATED | : September 7, 2021 |
| INVENTOR(S) | : Hauke Maritz Liefferink |

It is certified that error appears in the above-identified patent and that said Letters Patent is hereby corrected as shown below:

On the Title Page

Item (57) ABSTRACT, Line 5, change "accessing" to --assessing--;

In the Specification

Column 1, Line 20, change "accessing" to --assessing--;

Column 4, Line 36, change "accessing" to --assessing--;

Column 6, Line 61, change "accessing" to --assessing--;

In the Claims

Column 8, Line 7, change "accessing" to --assessing--;

Column 8, Line 24, change "accessing" to --assessing--; and

Column 8, Line 45, change "accessing" to --assessing--.

Signed and Sealed this
Thirty-first Day of January, 2023

Katherine Kelly Vidal
*Director of the United States Patent and Trademark Office*